United States Patent [19]

Arnold

[11] Patent Number: 4,615,396
[45] Date of Patent: Oct. 7, 1986

[54] MULTIPLE FARM IMPLEMENT ACTUATING SYSTEM

[75] Inventor: Loren G. Arnold, Ottawa, Ohio

[73] Assignee: Unverferth Manufacturing Company, Inc., Kalida, Ohio

[21] Appl. No.: 688,590

[22] Filed: Jan. 3, 1985

[51] Int. Cl.$^4$ ............................................. A01B 49/06
[52] U.S. Cl. ...................................... 172/138; 111/52; 172/142; 172/484; 172/776; 172/506
[58] Field of Search ............... 172/484, 452, 470, 488, 172/489, 468, 138, 140, 468, 473, 462, 780, 787, 142, 497, 500; 111/52, 85

[56] References Cited

U.S. PATENT DOCUMENTS

| | | | |
|---|---|---|---|
| 2,344,326 | 3/1944 | Ratcliff | 172/487 |
| 2,417,580 | 3/1947 | Young | 172/470 X |
| 2,505,280 | 4/1950 | Ellinghuysen | 172/138 X |
| 2,741,043 | 4/1956 | Lindbeck | 172/484 |
| 2,748,680 | 6/1956 | Aber | 172/462 |
| 2,886,116 | 5/1958 | Howard | 172/487 |
| 3,140,678 | 7/1964 | Morris | 172/462 X |
| 3,225,835 | 12/1965 | Steinbach | 172/138 |
| 3,314,386 | 4/1967 | Kopaska | 172/142 X |
| 3,528,507 | 9/1970 | Morkoski | 172/413 |
| 3,566,974 | 3/1971 | Kopaska | 172/500 X |
| 4,227,581 | 10/1980 | Klotzbach | 172/142 |
| 4,446,924 | 5/1984 | Dietrich | 172/40 |
| 4,450,917 | 5/1984 | Hake | 172/328 |
| 4,489,789 | 12/1984 | Pearce | 172/677 |
| 4,546,832 | 10/1985 | Dietrich | 172/500 |

Primary Examiner—Richard J. Johnson
Attorney, Agent, or Firm—Marshall & Melhorn

[57] ABSTRACT

A system for actuating a plurality of farm implements includes a frame adapted to be connected between a tractor and a first farm implement such as a drill. A tool frame, adapted to be connected to one or more additional farm implements, is pivotally suspended beneath the frame by front and rear support linkages. The rear support linkages are also connected with a linkage which raises and lowers the grain drills on the drill. An hydraulic actuator is connected to the front support linkage to move the tool frame and the drill between a transport position and a working position. Adjustment means are provided at the connection between the rear support linkage and the linkage to the drill for determining the transport height of the drill, the spring tension on the grain drills, and the height of the rear of the tool frame with respect to the front of the tool frame.

8 Claims, 4 Drawing Figures

MULTIPLE FARM IMPLEMENT ACTUATING SYSTEM

BACKGROUND OF THE INVENTION

1. Field of the Invention

This invention relates to farm implement actuators in general and in particular to a linkage system for simultaneously actuating a plurality of farm implements drawn by the same vehicle.

2. Description of the Prior Art

U.S. Pat. No. 2,344,326 discloses a mechanism for actuating working tools mounted on a tractor. Fluid-extensible devices are connected to the tractor for moving the tools to predetermined positions with respect to the tractor when retracted and when in the working position. A manually adjustable means adapted to react against the tractor and connected to a sleeve element surrounding the fluid-extensible device and slidable with respect thereto serves as a stop against which one of the extensible parts of the fluid-extensible device will abut as the fluid-extensible device is collapsed to place the working tools in their ground working position. The sleeve element can be adjusted in position to change the ground-working depth of the tools.

U.S. Pat. No. 2,417,580 discloses a potato digger with a lifting clutch mechanism for raising and lowering the operating means between ground engaging and transport positions. A pair of digging implements are connected in side by side relation and each includes a vertically adjustable shovel unit, elevator chain means supported on the shovel unit and the rear portion of the implement, a shaft supported on one of the implements and connected to drive the elevator chain means of both implements, means for driving the shaft, a power lift mechanism on one implement and operably connected to be driven by the shaft, and connections between the power lift mechanism and each of the shovel units whereby actuation of the power lift mechanism raises or lowers both shovel units.

U.S. Pat. No. 2,496,760 discloses a grading apparatus which includes a blade having a working height adjustment. The blade is connected to a pivoted beam. The beam is raised and lowered through a linkage including a threaded rod and bushing with a stop nut to determine the position of the blade as it is raised and lowered.

U.S. Pat. No. 2,617,342 discloses a lift mechanism for a farm implement that functions as a depth gauge in the operation of the implement and at the same time permits the implement to raise over objects. A lifting bar is attached to the frames of tools by chains which allow up and down movement of the tools but limit the depth of the tools. An adjustable set screw is utilized to determine the angle of the lifting bar with respect to the portion of the draw bar attached to the tractor.

U.S. Pat. No. 2,648,997 discloses an adjustable top link for a three point implement mounting linkage for adjusting the position of farm implements. The top link comprises a tubular member having longitudinally adjustable screw members projecting out of each end which threadably engage a pair of nut members contained in the tube. Each screw member the corresponding nut are oppositely threaded so that such screws may be moved inwardly or outwardly merely by rotating the tube portion. Each screw member includes a yoke for attachment to hitch points on the tractor and implement. A locking member prevents movement of the tube when the desired adjustment has been made.

U.S. Pat. No. 2,741,173 discloses a tiller implement frame wherein the rotary tiller units may be vertically adjusted in unison to a selected working depth without materially altering the working position of the rotary tillers relative to a horizontal plane. A hydraulic cylinder acts upon a lever arm which raises and lowers the rotary tillers. When the cylinder is extended, the tool is raised. When the cylinder is retracted, the tool is lowered with the lower depth being limited by a piston stop screw threaded axially into the cylinder at its forward end. The mechanism also includes a turnbuckle for varying the position of the mounting frame containing the tool relative to the horizontal plane.

U.S. Pat. No. 2,886,116 discloses a rotary cultivating apparatus. An implement frame is pivotally mounted on a carriage. A telescopic member including a cylinder having a trunnion connection to the implement frame contains a non-rotatable nut working on a screw threaded portion of a rod which extends through a trunnion block supported by a stanchion for determining the working depth of the implement. A compression spring reacts between the nut and the end of the cylinder. A hydraulic ram cylinder has one end pivoted from the stanchion and its piston rod pivotally connected to the implement for raising and lowering the implement.

U.S. Pat. No. 2,869,656 discloses a control mechanism for a tillage tool known as a middle buster. The height of the tool is determined by a connection to a ground-engaging gauge wheel by means of an eye-bolt pivotally connected at one end to the tool and slidably received in a swivel at the other end. The bolt is threaded for receiving a pair of nuts, one on each side of the swivel for adjusting the depth of the tool.

U.S. Pat. No. 3,547,203 discloses a back blade assembly utilizing a hydraulic cylinder to raise and lower a blade. Spring biased supports are provided to allow the blade to pivot about a pivot point when it strikes a ground protuberance. Threaded adjustments determine the amount of rotational movement of the blade for a given force.

SUMMARY OF THE INVENTION

The present invention concerns a mechanism for raising and lowering a plurality of farm implements drawn behind a vehicle. A multi-bar linkage actuated by a hydraulic cylinder raises and lowers the implements in unison. A threaded rod and stop nut are utilized to adjust the depth of the implements in the lowered position. The hydraulic cylinder is pivotally connected to a lever arm which provides a three to one mechanical advantage and is spring biased to absorb shocks created when the tools strike ground protuberances. In the preferred embodiment, the linkage is utilized to actuate a tilling tool with a roller and a wheeled grain drill.

DESCRIPTION OF THE PREFERRED EMBODIMENT

Figure 1:
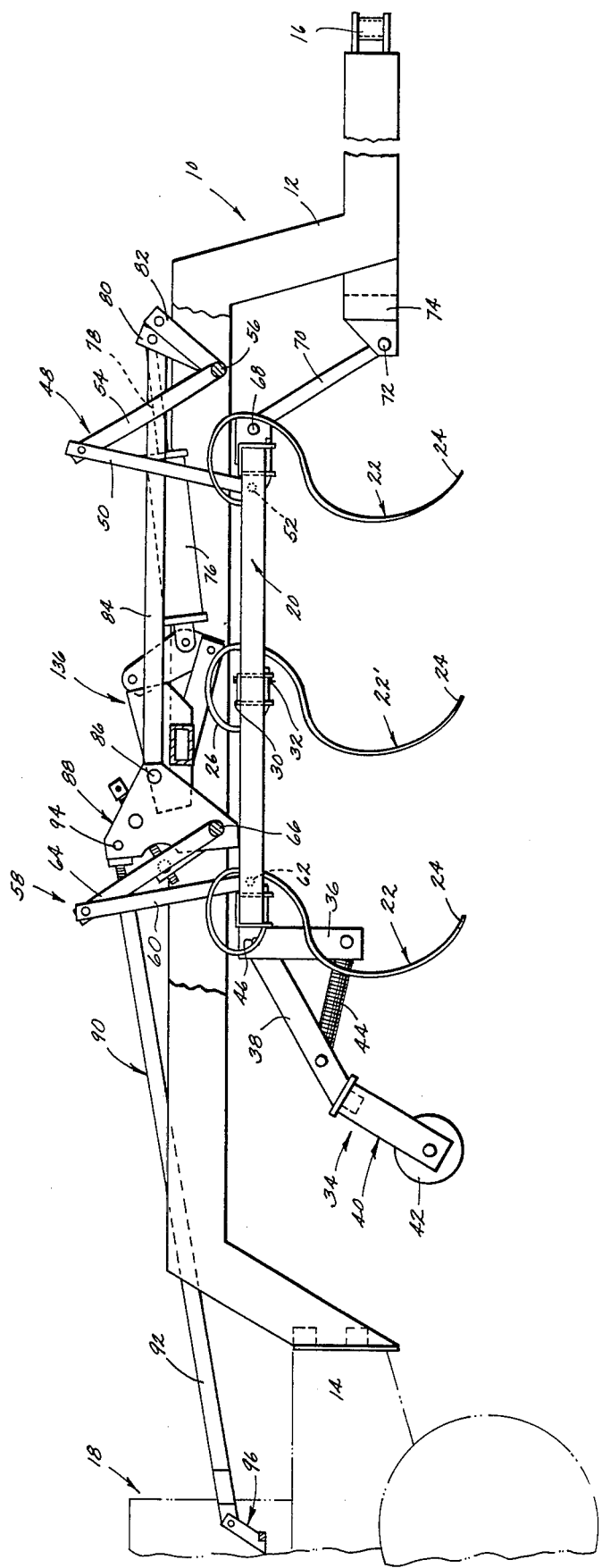
FIG. 1 is a side elevational view of a combination tilling and rolling tool connected between a vehicle and a drill with an actuating mechanism according to the present invention.
Figure 2:
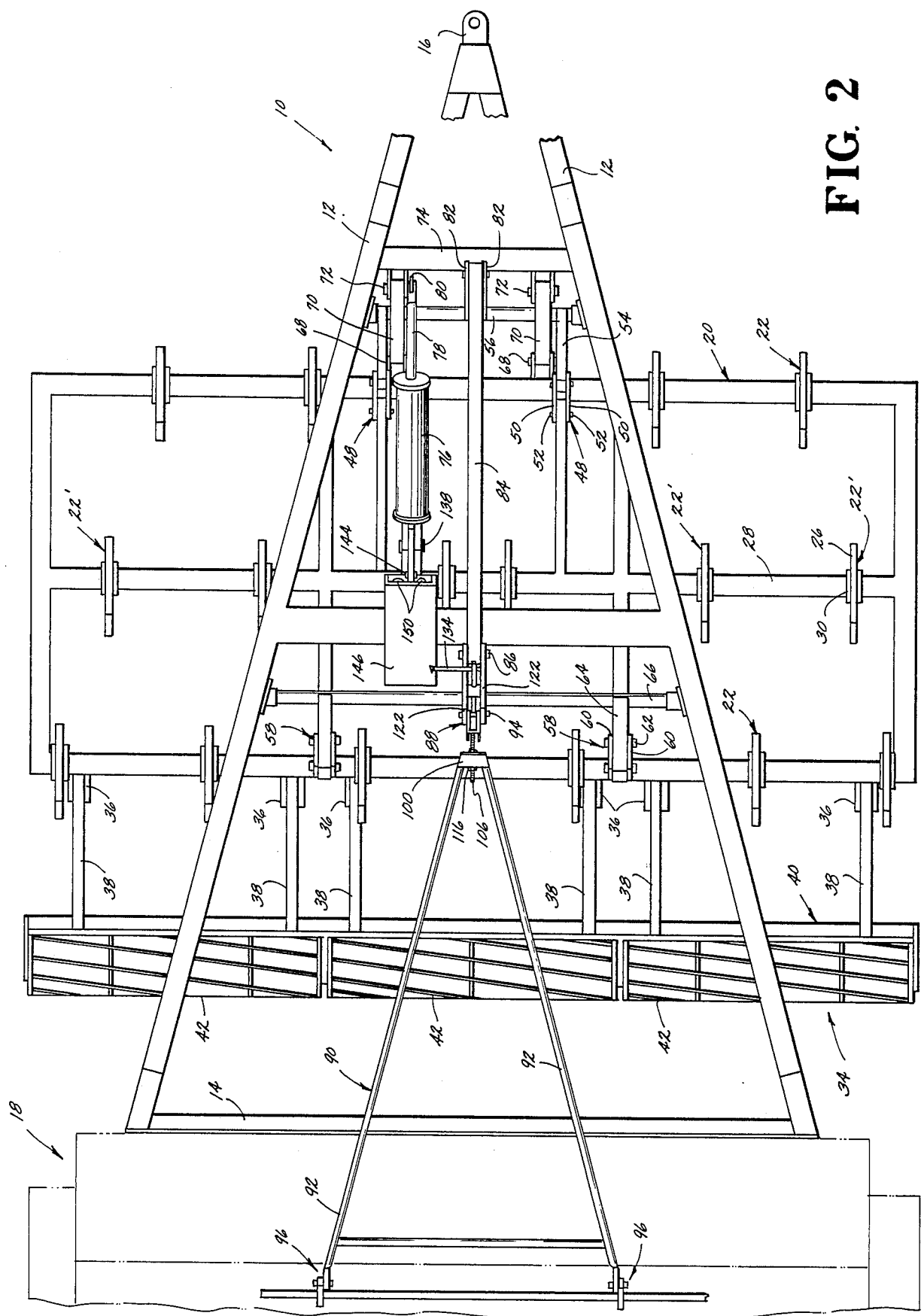
FIG. 2 is a plan view of the tools and actuating mechanism of FIG. 1.

There is shown in FIGS. 1 and 2 an actuating mechanism for a plurality of farm implements in accordance with the present invention. A hitch frame 10 is formed from a pair of side frame members 12 connected together at one end thereof and having opposite ends connected to the opposite ends of a rear frame member 14 to form a generally A-shaped frame. At the apex of the frame 10 there is attached a male member 16 of a pin and socket type hitch for the attachment of the frame 10 to the rear of a vehicle such as a tractor (not shown). A drill 18, shown in phantom, has a frame attached to the rear frame member 14 and is mounted on wheels such that the hitch frame 10 is supported between the vehicle and the drill 18.

The hitch frame 10 in turn supports a tool frame 20 having a plurality of S-shaped tilling tools 22 mounted thereon. Each tilling tool or tine 22 has a pointed lower end 24 pointed in the direction of forward travel of the farm implement. The upper end of each tine 22 extends upwardly forward of and adjacent to a horizontal cross member of the frame 20. For example, a tine 22' has an upper end 26 which extends upwardly through the frame 20 adjacent to and forward of a horizontal beam 28 of the frame 20.

The upper end 26 then curves over the frame member 28, downwardly adjacent the rear side of the frame 28 and further extends forwardly past the underside of the frame 28. A bracket 30 of generally inverted U-shaped form is fitted over the frame 28 and includes a slot (not shown) formed in each end thereof for receiving the end 26 of the tine 22'. Suitable means for securing the tine 22' to the bracket 30 can be utilized such as a bolt and nut 32 extending through a hole (not shown) formed in the base of the U-shaped bracket 30 and a hole (not shown) formed in the end 26 of the tine 22'. As the bolt and nut 32 are tightened, the end 26 is drawn toward the intermediate portion of the bracket 30 clamping the horizontal member 28 therebetween thereby securely attaching the tine 22' to the frame 20.

Mounted at the rear of the frame 20 is a second tool such as a roller implement 34. A plurality of vertically extending frame members 36 are attached at their upper ends to the rear of the frame 20. Each of a plurality of arms 38 have one end pivotally attached to an associated one of the vertical frame members 36. The other end of each of the arms 38 is attached to a frame 40 to which one or more rollers 42 are pivotally attached. The frame 40 and rollers 42 are commercially available from Unverferth Manufacturing Co., Inc., Kalida, Ohio as a farm implement for seedbed preparation under the trademark "ROLLING HARROW".

A plurality of spring means 44 are pivotally connected between a lower end of each of the vertical frame members 36 and a point adjacent the end of the arms 38 attached to the frame 40. Thus, the frame 40 and rollers 42 are free to rotate about a pivotal connection 46 between the arms 38 and the frame members 36 when the tool frame 20 is lowered to a ground engaging position. The reaction of the frame 40 and rollers 42 to changes in the level of the ground will tend to be isolated from the frame so as not to change the depth of penetration of the tilling tools attached to the frame 20.

The front end of the frame 20 is supported by a pair of spaced apart support linkage assemblies 48. A pair of spaced apart link arms 50 have their lower ends pivotally attached to a portion of the frame 20 at pivot point 52. The opposite end of each of the link arms 50 is pivotally attached to one end of a lever arm 54. An opposite end of the lever arm 54 is attached to a pivot rod 56 and radially extends from said pivot rod. The pivot rod 56 is rotatably supported between the side frame members 12. In FIG. 1, a section of the closer side frame member 12 has been broken away to allow the support linkage 48 to be shown.

Similarly, the rear of the frame 20 is supported by a pair of rear support linkages 58. Each of the linkages 58 has a pair of spaced apart link arms 60 each having a lower end pivotally connected to the frame 20 at a pivot point 62. An opposite end of each of the link arms 60 is pivotally connected to an end of a lever arm 64. An opposite end of the lever arm 64 is attached to a pivot rod 66 and extends radially from said pivot rod. The pivot rod 66 is rotatably supported at its ends by the side frame members 12.

It can be appreciated that as the pivot rods 56 and 66 are rotated in a counterclockwise direction, the upper ends of the lever arms 54 and 64 will rotate to lower the link arms 50 and 60 respectively and thereby lower the frame 20 toward the ground. Conversely, as the pivot rods 56 and 66 are rotated in a clockwise direction, the lever arms 54 and 64 respectfully will be rotated to lift the forward and rear portions of the tool frame 20 respectively away from the ground.

As the ends 24 of the tine 22 and the rollers 42 engage the ground, there will be a tendency for the tools and the tool frame 20 to ride on the top of the ground and shift toward the rear of the frame 10 by rotating the link arms 50 and 60 in a clockwise direction about the ends of the lever arms 54 and 64 respectively. However, it is desired to have the ends 24 of the tines 22 dig into the ground and have the bars on the rollers 42 penetrate the ground in order to condition the soil. Thus, the forward end of the tool frame 20 is pivotally connected to an extension of the side frame members 12. A pair of link arms 70 each have one end connected to a pair of pivot points 68 on the frame 20 and another end pivotally connected to a pair of pivot points 72 extending from a cross bar 74 attached between the side frame members 12. The lever arm 70 is rotated to a generally horizontal position as the frame 20 is lowered and limits the rearward movement of the frame 20 with respect to the frame 10 such that the ends 24 of the tines 22 and the bars of the rollers 42 dig into the ground.

The pivot rod 56 is rotated in response to the action of a hydraulic cylinder 76. A rod 78 extends from one end of the cylinder 76 and is pivotally connected to an end of a lever arm 80. An opposite end of the lever arm 80 is attached to the pivot rod 56 and extends radially from said pivot rod. As the hydraulic cylinder 76 extends the rod 78 toward the front of the frame 10, the lever arm 80 and the pivot rod 56 are rotated in a clockwise direction to raise the forward end of the tool frame 20. As the hydraulic cylinder 76 retracts the rod 78, the lever arm 80 and the pivot rod 56 are rotated in a counterclockwise direction to lower the forward end of the tool frame 20.

A pair of spaced apart lever arms 82 extend radially from the pivot rod 56 and have their outer ends pivotally connected to one end of a link arm 84. An opposite end of the link arm 84 is pivotally connected at pivot point 86 located at a forwardly extending point of a generally triangular pivot plate 88. The pivot plate 88 and associated linkage is shown in more detail in FIG. 3. A lower point of the pivot plate 88 is attached to the pivot rod 66. Thus, clockwise rotation of the pivot rod 56 is transmitted through the lever arm 80, the link arm 84 and the pivot plate 88 to rotate the pivot rod 66 in a clockwise direction. Counterclockwise rotation of the pivot rod 56 is similarly transmitted through the above described linkage to rotate the pivot rod 66. Thus, the tool frame 20 is raised and lowered in a generally horizontal position by the single action of the hydraulic cylinder 76.

An upper point of the pivot plate 88 is pivotally connected to one end of a generally A-shaped link frame 90. The frame 90 includes a pair of side links 92 attached at their forward ends to the pivot plate 88 at a pivot point 94. The opposite ends of the side links 92 are spaced apart and are pivotally attached to a linkage 96 mounted on the drill 18. The linkage 96 operates the grain drill mechanism which is not shown and is conventional in the art. Thus, as the hydraulic cylinder 76 is actuated, the tool frame 20 is moved simultaneously with the operation of the grain drill mechanism of the drill 18 thereby coordinating the operation of three farm implements, the tilling tools 22, the roller 42, and the drill 18.

The degree of rotation of the pivot rod 66 determines the distance which the rear of the tool frame 20 is lowered and also the depth to which the grain drill mechanism is lowered. To accommodate for differences between various types and manufacturers of tools, an adjusting mechanism has been provided in the connection between the side links 92 and the pivot point 94 as shown in FIG. 3.

Figure 3:
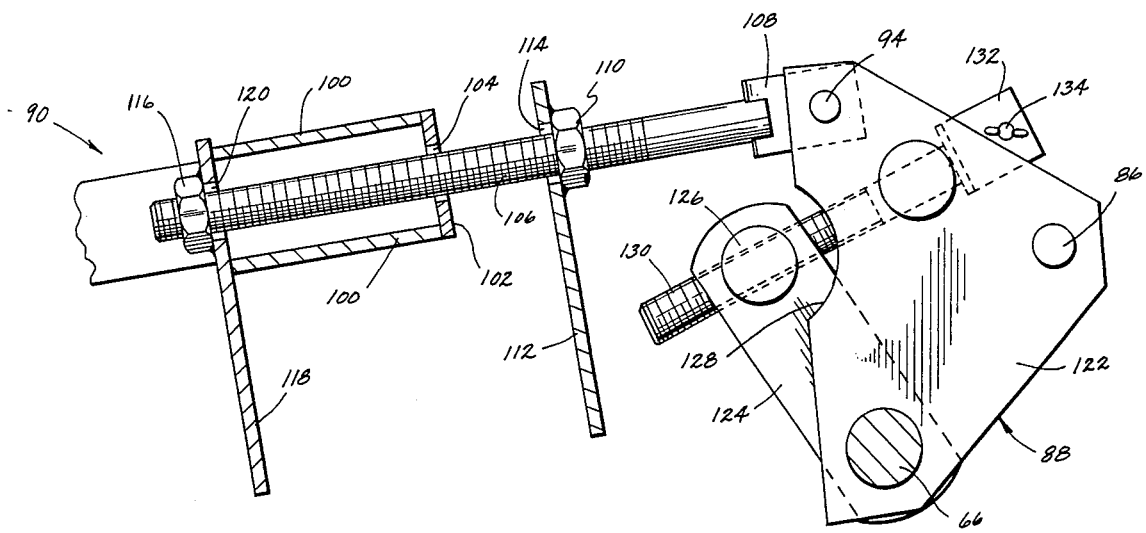
FIG. 3 is a side elevational view in partial cross section of the depth adjustment mechanism according to the present invention.

Referring to FIGS. 2 and 3, there is shown an enlarged side elevational view of the connection between the pivot plate 88 and the link frame 90. The side links 92 are joined at their forward ends by a pair of trapezoidal shaped plates 100 attached to the upper and lower edges of the side links 92. The forward ends of the side links 92 and the plates 100 are joined by a front plate 102 which has an aperture 104 formed therein. A connecting rod 106 extends through the aperture 104 and between the plates 100 and the side links 92. The forward end of the rod 106 is slotted to receive a tab 108 which is fastened thereto. The tab 108 is pivotally connected to the pivot plate 88 at the pivot point 94.

The connecting rod 106 is threaded for a substantial portion of its length beginning from a point forward of the front plate 102 to the end of the rod 106 which extends beyond the rearward ends of the plates 100. A first stop nut 110 is attached to a handle 112 adjacent an end of the handle wherein there is formed an aperture 114. A second stop nut 116 is affixed to a handle 118 adjacent an end of the handle in which an aperture 120 has been formed. The connecting rod and stop nuts can be assembled by threading the first stop nut 110 onto the threaded end of the connecting rod 106 and turning the handle 112 until the stop nut 110 is positioned adjacent the unthreaded end of the connecting rod 106. The threaded end of the connecting rod 106 is then inserted through the aperture 104 and threaded through the second stop nut 116 while holding the stop nut adjacent the rearward edges of the plates 100 with the handle 118. The tab 108 is then connected to the pivot point 94.

As shown in FIGS. 1, 2 and 3, the pivot plate 88 has been rotated to its most clockwise position about the pivot rod 66. The position of the second stop nut 116 on the connecting rod 106 determines the extent of forward movement of the link frame 90 and thereby the transport height of the drill 18. When the pivot plate 88 is rotated in a counterclockwise direction about the pivot rod 66, the connecting rod 106 will move in a rearward direction through the aperture 104 until the handle 112 engages the front plate 102. At this point, the link frame 90 moves with the pivot plate 88 rotating the drill actuating mechanism 96 in a counterclockwise direction. The rotation of the drill actuating mechanism 96 typically increases the spring tension on grain drills to actuate them into a working mode. Thus, the position of the first stop nut 110 on the connecting rod 106 determines the spring tension on the grain planting drills. The positions of the first and second stop nuts can be adjusted independently.

As best seen in FIG. 2, the pivot plate 88 is formed from a pair of substantially identical plates 122. The plates 122 are pivotally mounted on the pivot rod 66 and are maintained in a predetermined spaced apart relationship. The link arm 84 and the tab 108 extend between the plates 122 and are pivotally attached to them at the pivot points 86 and 94, respectively. As shown in FIG. 3, also extending between the pivot plates 122 is a pair of spaced apart lever arms 124 which extend radially from the pivot rod 66. The outer ends of the lever arms 124 are connected by a pin 126 axially aligned with the pivot rod 66. The ends of the pin 126 extend beyond the outer surfaces of the lever arms 124 and into the plane of the plates 122. Each of the plates 122 has a semi-circular cutout 128 formed along the rearwardly facing edge thereof.

When the hydraulic cylinder 76 rotates the pivot rod 56 in a counterclockwise direction, the link arm 84 rotates the plates 122 in a counterclockwise direction about the pivot rod 66. However, the pivot rod 66 is not rotated by this action. A connecting rod 130 has a threaded end which threadably engages the pin 126 between the lever arms 124. The opposite end of the connecting rod 130 has a tab 132 attached thereto. A handle 134 in the form of a rod with flattened ends is slidably retained in an aperture formed in the tab 132. The handle 134 is utilized to rotate the connecting rod 130 thereby adjusting the angular position of the plates 122 with respect to the lever arms 124. This mechanism allows a leveling adjustment for the rearward end of the tool frame 20 with respect to its forward end. The handle 134 engages the edges of the plates 122. When the plates 122 are rotated in a counterclockwise direction, the weight of the rear of the tool frame 20 tends to rotate the lever arms 64 in a counterclockwise direction thereby rotating the pivot rod 66. The lever arms 124 are maintained in a predetermined angular relationship with the plates 122 through the connecting rod 130, tab 132 and handle 134. Similarly, when the plates 122 are rotated in a clockwise direction, they rotate the pivot rod 66 through the linkage of the handle 134, the tab 132, the connecting rod 130 and the lever arms 124.

Figure 4:
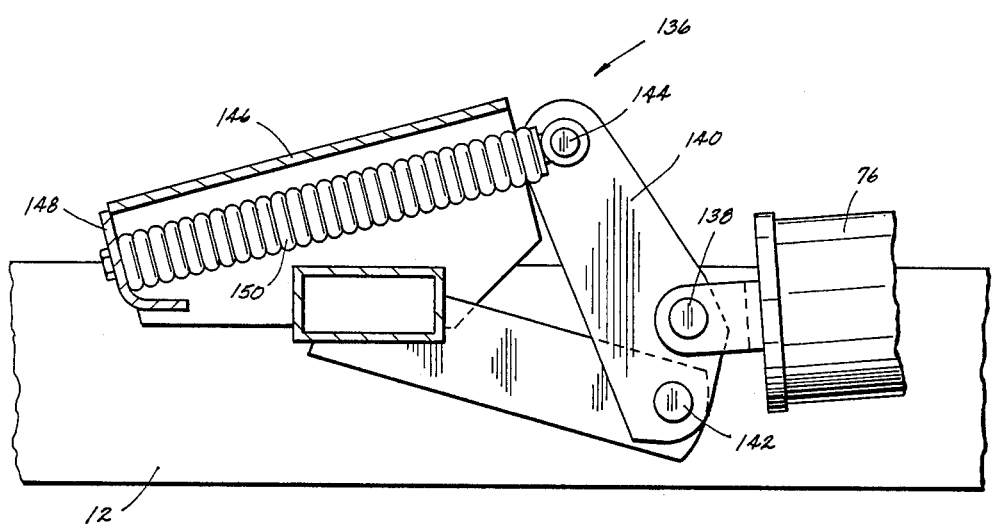
FIG. 4 is a side elevational view of the shock absorbing mechanism of the present invention.

There is shown in FIG. 4, a side elevational view in partial cross section of a spring tension means 136 connected between the hydraulic cylinder 76 and the frame 12. The hydraulic cylinder 76 is pivotally connected at a pivot point 138 to a lever arm 140. The lever arm 140 is pivotally connected at a pivot point 142 to the side frame members 12. The pivot point 142 is located at a lower end of the lever arm 140 while another pivot point 144 is located at an upper end of the lever arm 140. The pivot point 138 is positioned a distance from the center of rotation of the pivot point 142 which is about one third of the distance between the axes of the pivot points 142 and 144. Thus, the pivot point 144 will move approximately three times the distance that the pivot point 138 moves when the lever arm 140 is rotated about the pivot point 142 by the hydraulic cylinder 76.

A spring housing 146, shown in cross section, is attached to the side frame members 12. An end plate 148 is attached to the spring housing 146 at the rearward end thereof. A pair of helical springs 150 each have one end attached to the end plate 148 and the other end pivotally connected to the lever arm 140 at the pivot point 144. As the hydraulic cylinder 76 retracts the rod 78 to lower the tool frame 20 and the drill 18 to a working position, the springs 150 resist rotation of the lever arm 140. When the tools suspended from the tool frame receive a shock from striking the ground or an object, the springs 150 extend and the lower arm 140 rotates in a clockwise direction about the pivot point 142 to relieve the load impressed on the cylinder 76 and linkage to prevent damage. The springs 150 also tend to hold the tools in the ground during working.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

What is claimed is:

1. An apparatus for actuating a plurality of farm implements comprising:
    a frame having means for connection to a vehicle for drawing farm implements and for connection to a first farm implement;
    a tool frame having means for attaching to a second farm implement;
    a support linkage means pivotally connected between said frame and said tool frame for suspending said tool frame beneath said frame;
    means for actuating connected to said support linkage means for moving said tool frame between a transport position and a working position;
    spring tension means connected between said means for actuating and said frame for assisting said means for actuating during the lowering of a first farm implement and said tool frame to a working position, and for relieving loads on said means for actuating when a first farm implement and a second farm implement are being used in the working position including a lever arm pivotally attached at one end to said frame, spring means having one end attached to said frame and another end pivotally connected to another end of said lever arm, and said means for actuating pivotally connected to said lever arm intermediate said ends of said lever arm;
    linkage means for connection to a first farm implement and connected to and actuated by said means for actuating for moving a first farm implement between a transport position and a working position; and
    height adjustment means connected to said linkage means for adjusting the transport height of a first farm implement connected to said linkage means and said frame with respect to the transport height of a second farm implement attached to said tool frame.

2. The apparatus according to claim 1 wherein said height adjustment means includes a threaded connecting rod having one end attached to said means for actuating said support linkage, connecting means attached to said linkage means having an aperture adapted to accept an opposite end of said connecting rod, and a stop nut threaded onto said opposite end of said connecting rod for cooperation with said connecting means whereby the position of said stop nut on said threaded connecting rod determines the transport height of a first farm implement attached to said frame with respect to the transport height of a second farm implement attached to said tool frame.

3. The apparatus defined in claim 2 including a handle attached to and radially extending from said stop nut and adapted for hand rotation of said stop nut to a desired position on said threaded connecting rod.

4. The apparatus according to claim 2 including another stop nut threadably engaging said threaded connecting rod and positioned between said connecting means and said one end of said connecting rod attached to said means for actuating whereby the position of said another stop nut on said connecting rod determines a working position of a first farm implement attached to said frame.

5. The apparatus according to claim 4 wherein the position of said another stop nut on said threaded connecting rod determines the amount of pressure applied to grain planting units by springs when said frame is connected to a drill having spring actuated planting units mounted thereon and said means for actuating positions the drill in the working position.

6. The apparatus according to claim 1 wherein said height adjustment means includes a threaded connecting rod having one end threadably engaged by said linkage means and another end in abutting contact with said linkage means for varying the position of said support linkage means with respect to said linkage means thereby adjusting the position of said tool frame with respect to a first farm implement attached to said frame.

7. The apparatus according to claim 6 wherein said another end of said threaded connecting rod abutts a portion of said support linkage means supporting a rear portion of said tool frame whereby the position of the threaded engagement with said threaded connecting rod determines the working position of the rear of said tool frame with respect to the front of said tool frame.

8. The apparatus according to claim 1 wherein said pivotal connection of said means for actuating is spaced from said pivotal connection of said lever arm to said frame a distance which is approximately one third of the distance between said pivotal connection of said lever arm to said frame and said pivotal connection of said lever arm to said spring means.

* * * * *